United States Patent
Yoshida et al.

(10) Patent No.: US 11,440,200 B2
(45) Date of Patent: Sep. 13, 2022

(54) MONITORING METHOD

(71) Applicant: KAWASAKI JUKOGYO KABUSHIKI KAISHA, Kobe (JP)

(72) Inventors: Masaya Yoshida, Himeji (JP); Hiroyuki Okada, Kakogawa (JP); Atsushi Nakaya, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 344 days.

(21) Appl. No.: 16/766,858

(22) PCT Filed: Sep. 10, 2018

(86) PCT No.: PCT/JP2018/033433
§ 371 (c)(1),
(2) Date: May 26, 2020

(87) PCT Pub. No.: WO2019/102688
PCT Pub. Date: May 31, 2019

(65) Prior Publication Data
US 2020/0298416 A1     Sep. 24, 2020

(30) Foreign Application Priority Data

Nov. 24, 2017    (JP) .............................. JP2017-226307

(51) Int. Cl.
*B25J 11/00*     (2006.01)
*B25J 9/16*     (2006.01)
(Continued)

(52) U.S. Cl.
CPC ............. *B25J 11/0095* (2013.01); *B25J 9/12* (2013.01); *B25J 9/1674* (2013.01); *G01M 99/005* (2013.01)

(58) Field of Classification Search
CPC ........ B25J 11/0095; B25J 9/12; B25J 9/1674; B25J 19/06; B25J 9/1653; G01M 99/005; G01M 99/008
(Continued)

(56) References Cited

U.S. PATENT DOCUMENTS 5,241,482 A * 8/1993 Iida ..................... G05B 19/4184
                                            700/83
6,232,737 B1 * 5/2001 Kachi ................ G05B 19/4062
                                            318/568.22
(Continued)

FOREIGN PATENT DOCUMENTS

| JP | 2013-066987 A | 4/2013 |
|---|---|---|
| JP | 2017-062730 A | 3/2017 |
| JP | 2017-200710 A | 11/2017 |

*Primary Examiner* — Jaime Figueroa
(74) *Attorney, Agent, or Firm* — Oliff PLC

(57) ABSTRACT

A method of monitoring a robot including a plurality of actuators and configured to perform a predetermined process operation, the method including: a preliminary operation step of causing the robot to perform the predetermined process operation one or more times and detecting, in each of a plurality of process phases, assigned monitoring parameters for the actuators operating in the process phase; a ranking step of deriving a load level based on a predetermined load evaluation procedure for each of the monitoring parameters detected in the preliminary operation step and ranking all of the detected monitoring parameters in decreasing order of the load level; and a normal operation step of monitoring primarily a monitoring parameter highly ranked in the ranking step, wherein the monitoring is performed for the actuator that operates in the process phase in which the highly ranked monitoring parameter was detected.

10 Claims, 6 Drawing Sheets

(51) Int. Cl.
B25J 9/12 (2006.01)
G01M 99/00 (2011.01)

(58) Field of Classification Search
USPC ............... 700/245–264; 318/568.11–568.25
See application file for complete search history.

(56) References Cited

U.S. PATENT DOCUMENTS

| | | | | |
|---|---|---|---|---|
| 6,899,765 | B2* | 5/2005 | Krivts | H01L 21/67126 |
| | | | | 156/345.31 |
| 7,642,740 | B2* | 1/2010 | Abe | H02P 23/0077 |
| | | | | 318/432 |
| 7,659,966 | B2* | 2/2010 | Matsumoto | H01L 21/67353 |
| | | | | 355/75 |
| 8,173,971 | B2* | 5/2012 | Gunji | H01L 21/67769 |
| | | | | 414/217 |
| 8,276,506 | B2* | 10/2012 | Tojo | B25J 9/0003 |
| | | | | 99/348 |
| 8,303,231 | B2* | 11/2012 | Yu | H01L 21/67772 |
| | | | | 414/811 |
| 8,356,207 | B2* | 1/2013 | Hosek | G06F 11/008 |
| | | | | 714/48 |
| 9,647,513 | B2* | 5/2017 | Park | H02K 11/33 |
| 9,808,246 | B2* | 11/2017 | Shelton, IV | A61B 18/1445 |
| 10,095,244 | B2* | 10/2018 | Otsuji | G05D 3/20 |
| 11,314,241 | B2* | 4/2022 | Maekawa | G05B 15/02 |
| 2001/0056396 | A1* | 12/2001 | Goino | G06Q 30/0601 |
| | | | | 705/37 |
| 2003/0185715 | A1* | 10/2003 | Krivts | H01L 21/67126 |
| | | | | 118/730 |
| 2007/0002516 | A1* | 1/2007 | Matsumoto | H01L 21/67353 |
| | | | | 361/234 |
| 2007/0067678 | A1* | 3/2007 | Hosek | G05B 23/0235 |
| | | | | 714/25 |
| 2008/0203302 | A1* | 8/2008 | Gunji | H01L 21/67769 |
| | | | | 250/311 |
| 2009/0079379 | A1* | 3/2009 | Abe | H02P 23/0077 |
| | | | | 318/568.24 |
| 2009/0087287 | A1* | 4/2009 | Yu | H01L 21/67772 |
| | | | | 414/217.1 |
| 2009/0099691 | A1* | 4/2009 | Tojo | B25J 9/0003 |
| | | | | 901/41 |
| 2012/0056509 | A1* | 3/2012 | Anderson | H02N 2/10 |
| | | | | 310/317 |
| 2014/0070752 | A1* | 3/2014 | Otsuji | G05D 3/20 |
| | | | | 318/603 |
| 2014/0201571 | A1* | 7/2014 | Hosek | G05B 19/41875 |
| | | | | 714/26 |
| 2015/0100159 | A1* | 4/2015 | Park | H02K 11/21 |
| | | | | 310/68 B |
| 2016/0256184 | A1* | 9/2016 | Shelton, IV | A61B 17/068 |
| 2018/0158556 | A1 | 6/2018 | Azuma et al. | |
| 2019/0137984 | A1* | 5/2019 | Maekawa | G01M 13/02 |

\* cited by examiner

| Position deviation ranking (AX1) | | |
|---|---|---|
| Rank | Load level | Process phase |
| 1st | 80% | 10th |
| 2nd | 75% | 25th |
| 3rd | 71% | 42nd |

FIG.3A

| Position deviation ranking (AX2) | | |
|---|---|---|
| Rank | Load level | Process phase |
| 1st | 90% | 3rd |
| 2nd | 85% | 12th |
| 3rd | 82% | 10th |

FIG.3B

| Position deviation ranking (AX3) | | |
|---|---|---|
| Rank | Load level | Process phase |
| 1st | 77% | 5th |
| 2nd | 63% | 2nd |
| 3rd | 60% | 38th |

FIG.3C

| Speed deviation ranking (AX1) | | |
|---|---|---|
| Rank | Load level | Process phase |
| 1st | 75% | 41st |
| 2nd | 74% | 4th |
| 3rd | 73% | 26th |

FIG.4A

| Speed deviation ranking (AX2) | | |
|---|---|---|
| Rank | Load level | Process phase |
| 1st | 68% | 22nd |
| 2nd | 63% | 2nd |
| 3rd | 59% | 41st |

FIG.4B

| Speed deviation ranking (AX3) | | |
|---|---|---|
| Rank | Load level | Process phase |
| 1st | 78% | 8th |
| 2nd | 72% | 18th |
| 3rd | 68% | 38th |

FIG.4C

| Acceleration deviation ranking (AX1) | | |
|---|---|---|
| Rank | Load level | Process phase |
| 1st | 97% | 7th |
| 2nd | 95% | 11th |
| 3rd | 88% | 32nd |

FIG.5A

| Acceleration deviation ranking (AX2) | | |
|---|---|---|
| Rank | Load level | Process phase |
| 1st | 91% | 20th |
| 2nd | 88% | 22nd |
| 3rd | 79% | 13th |

FIG.5B

| Acceleration deviation ranking (AX3) | | |
|---|---|---|
| Rank | Load level | Process phase |
| 1st | 90% | 21st |
| 2nd | 89% | 17th |
| 3rd | 84% | 5th |

FIG.5C

| Current value ranking (AX1) | | |
|---|---|---|
| Rank | Load level | Process phase |
| 1st | 97% | 7th |
| 2nd | 95% | 11th |
| 3rd | 89% | 29th |

FIG.6A

| Current value ranking (AX2) | | |
|---|---|---|
| Rank | Load level | Process phase |
| 1st | 91% | 20th |
| 2nd | 81% | 22nd |
| 3rd | 79% | 30th |

FIG.6B

| Current value ranking (AX3) | | |
|---|---|---|
| Rank | Load level | Process phase |
| 1st | 90% | 21st |
| 2nd | 79% | 17th |
| 3rd | 77% | 43rd |

FIG.6C

MONITORING METHOD

TECHNICAL FIELD

The present invention relates to a method of monitoring a robot including a plurality of actuators and configured to perform a predetermined process operation.

BACKGROUND ART

A method of monitoring a robot including a plurality of actuators (e.g., motors mounted respectively on a plurality of joint shafts) and configured to perform a predetermined process operation has been conventionally known. Such a monitoring method is carried out, for example, by an abnormality detection apparatus as disclosed in Patent Literature 1.

The abnormality determination apparatus of Patent Literature 1 determines whether a robotic device is subjected to an abnormal external force based on calculation values resulting from calculation performed on current values detected respectively by different detection parts and based on allowable calculation value ranges predetermined in association with different motion patterns. This abnormality determination apparatus further determines whether the robotic device has an abnormality in its motion based on a total current value obtained by summing the current values detected by the different detection parts and based on an allowable total operating current range acquired by an acquisition part.

CITATION LIST

Patent Literature

PTL 1: Japanese Laid-Open Patent Application Publication No. 2013-66987

SUMMARY OF INVENTION

Technical Problem

In Patent Literature 1, in order to determine the presence or absence of an abnormality, current values detected by different detection parts are each subjected to calculation, and the resulting calculation values are checked as to whether they are within allowable calculation value ranges predetermined for different motion patterns. Thus, the abnormality detection apparatus of Patent Literature 1 must handle a large amount of data. This leads to various problems such as reduced processing speed, reduced reliability of calculation process, and the need for expensive devices.

It is therefore an object of the present invention to provide a robot monitoring method able to reduce the amount of data to be handled as compared to conventional methods and thereby solve various problems.

Solution to Problem

In order to achieve the above object, a monitoring method according to the present invention is a method of monitoring a robot including a plurality of actuators and configured to perform a predetermined process operation, wherein at least one of the actuators is set as a monitoring target, at least one type of monitoring parameter related to operation of the actuator is assigned to the or each actuator set as the monitoring target, the predetermined process operation includes a plurality of process phases which are performed sequentially in time, and the at least one actuator set as the monitoring target operates in each of the process phases, the method including: a preliminary operation step of causing the robot to perform the predetermined process operation one or more times and detecting, in each of the process phases, the or each assigned monitoring parameter for the or each actuator operating as the monitoring target in the process phase; a ranking step of deriving a load level based on a predetermined load evaluation procedure for each of the monitoring parameters detected in the preliminary operation step and ranking all of the detected monitoring parameters in decreasing order of the load level; and a normal operation step of monitoring primarily a monitoring parameter highly ranked in the ranking step, wherein the monitoring is performed for the actuator that operates in the process phase in which the highly ranked monitoring parameter was detected.

In the above configuration, the monitoring parameter highly ranked in the ranking step is primarily monitored for the actuator that operates in the process phase in which the highly ranked monitoring parameter was detected. As such, a robot monitoring method can be provided which is able to reduce the amount of data to be handled as compared to conventional methods and thereby solve various problems.

The actuators may be motors mounted on at least one joint shaft of the robot.

With this configuration, when monitoring is performed for the motors mounted on the at least one joint shaft of the robot, the amount of data to be handled can be reduced.

In the normal operation step, only the monitoring parameter highly ranked in the ranking step may be monitored for the actuator that operates in the process phase in which the highly ranked monitoring parameter was detected.

This configuration allows a further reduction in the amount of data to be handled. Consequently, the advantage provided by the present invention can be made evident.

For example, at least one of position deviation, speed deviation, acceleration deviation, and current value which are related to the operation of the actuator may be assigned as the monitoring parameter.

A plurality of the monitoring parameters may be assigned to each actuator.

With this configuration, each actuator can be monitored from different aspects based on the plurality of monitoring parameters, and thus the accuracy of the monitoring can be increased.

The process phases may be defined by dividing the predetermined process operation so that each process phase corresponds to a work or motion performed by the robot.

With this configuration, the ranking can be made as to which work or motion of the robot imposes a high level of load on which part of the robot.

Once the ranking step is completed, a notification of completion of the ranking step may be provided.

This configuration allows the user to know the completion of the ranking step.

A warning may be given when the load level of the actuator under monitoring in the normal operation step exceeds a predetermined threshold.

This configuration allows the user to know that the load level of the motor has exceeded the predetermined threshold.

The robot may be a transfer robot configured to perform the predetermined process operation in a manufacturing site.

With this configuration, the monitoring can be performed for a transfer robot configured to perform the predetermined process operation in a manufacturing site.

The manufacturing site may be a semiconductor manufacturing site, and the robot may be a transfer robot configured to transfer semiconductor wafers.

With this configuration, the monitoring can be performed for a transfer robot configured to perform the predetermined process operation including transfer of semiconductor wafers in a semiconductor manufacturing site.

Advantageous Effects of Invention

The present invention can provide a robot monitoring method able to reduce the amount of data to be handled as compared to conventional methods and thereby solve various problems.

BRIEF DESCRIPTION OF DRAWINGS

FIGS. 3A to 3C show an example of a position deviation ranking result obtained in a ranking step of the monitoring method according to the embodiment of the present invention.

FIGS. 4A to 4C show an example of a speed deviation ranking result obtained in the ranking step of the monitoring method according to the embodiment of the present invention.

FIGS. 5A to 5C show an example of an acceleration deviation ranking result obtained in the ranking step of the monitoring method according to the embodiment of the present invention.

FIGS. 6A to 6C show an example of a current value ranking result obtained in the ranking step of the monitoring method according to the embodiment of the present invention.

DESCRIPTION OF EMBODIMENTS

Figure 1:
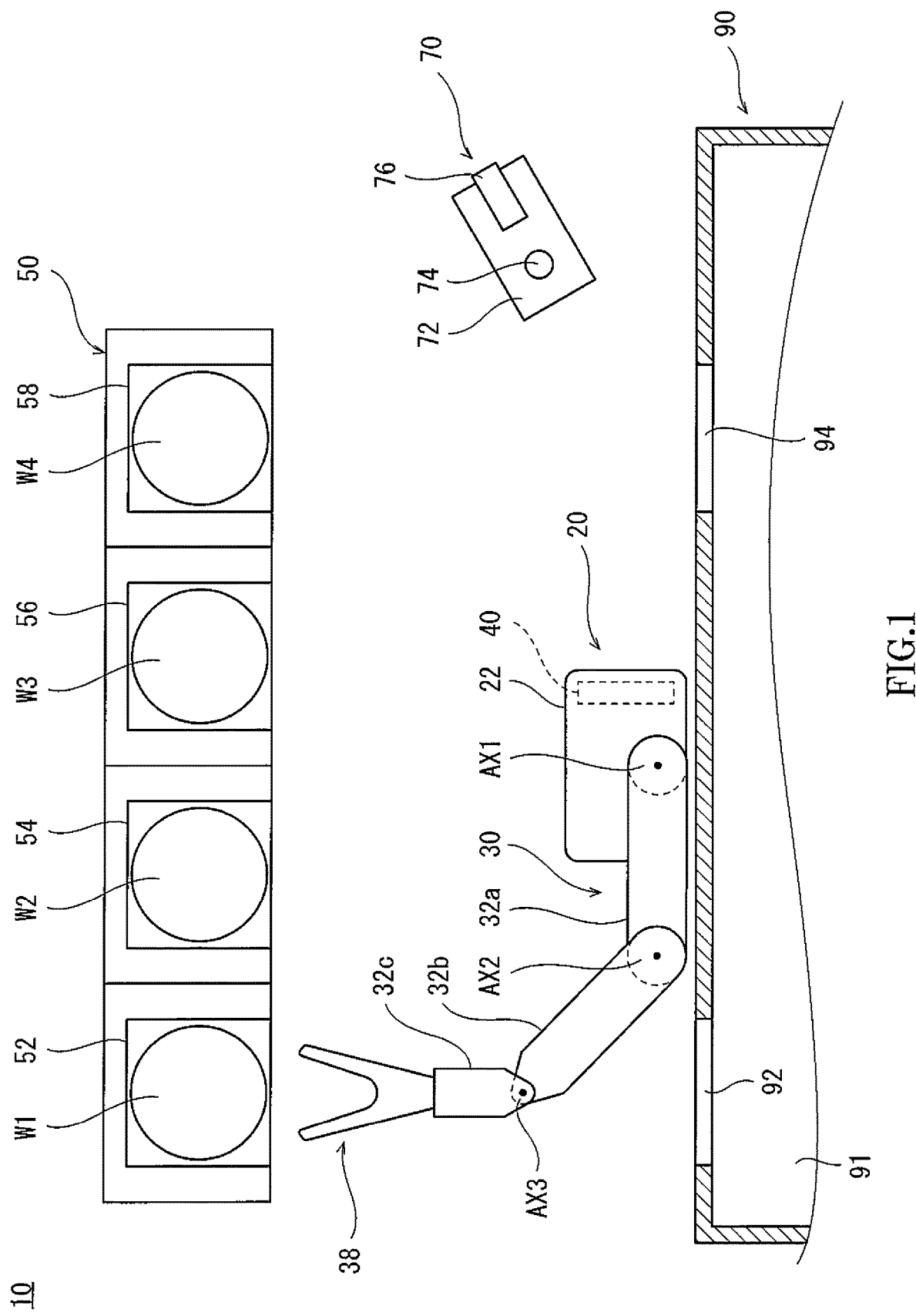
FIG. 1 is a schematic diagram illustrating a robotic system in which a monitoring method according to an embodiment of the present invention is implemented.

Hereinafter, an embodiment of the present invention will be described with reference to the accompanying drawings. The same or equivalent elements are denoted by the same reference signs throughout the drawings, and will not be described repeatedly. FIG. 1 is a schematic diagram illustrating a robotic system in which a monitoring method according to the present embodiment is implemented.

Robotic System 10

The monitoring method according to the present embodiment is implemented in a robotic system 10 including a robot 20 in order to monitor the robot 20 performing a predetermined process operation in a clean room as a semiconductor manufacturing site.

As shown in FIG. 1, the robotic system 10 includes, in addition to the robot 20, an accommodation member 50 configured to accommodate semiconductor wafers W, a prealigner 70 configured to adjust the angular positions of the semiconductor wafers W, and a processing device 90 configured to process the semiconductor wafers W. The accommodation member 50 is separated from the processing device 90 by a space in which the robot 20 and the prealigner 70 are disposed.

Robot 20

The robot 20 according to the present embodiment is a transfer robot configured to transfer the semiconductor wafers W in a clean room as a semiconductor manufacturing site. The robot 20 is a three-axis robot of the so-called horizontal articulated type and includes three joint shafts (a first joint shaft AX1, a second joint shaft AX2, and a third joint shaft AX3). The robot 20 includes: a base 22; an elevating shaft (not shown) mounted on the upper surface of the base 22 and extendable and retractable in the upward/downward direction; a robotic arm 30 mounted on the upper end of the elevating shaft; an end effector 38 mounted on the distal end of the robotic arm 30; and a robot controller 40 that controls the robotic arm 30 and the end effector 38.

The elevating shaft mounted on the upper surface of the base 22 is embodied, for example, by a non-illustrated air cylinder so as to be extendable and retractable.

The robotic arm 30 includes a first arm 32a, a second arm 32b, and a wrist 32c which are embodied by elongated members extending horizontally. One longitudinal end of the first arm 32a is coupled to the upper end of the elevating shaft via the first joint shaft AX1 which is actuated by a non-illustrated motor (actuator). Thus, the first arm 32a is mounted to the elevating shaft so as to be pivotable about an axis extending vertically. One longitudinal end of the second arm 32b is coupled to the other longitudinal end of the first arm 32a via the second joint shaft AX2 which is actuated by a non-illustrated motor (actuator). Thus, the second arm 32b is mounted to the first arm 32a so as to be pivotable about an axis extending vertically. One longitudinal end of the wrist 32c is coupled to the other longitudinal end of the second arm 32b via the third joint shaft AX3 which is actuated by a non-illustrated motor (actuator). Thus, the wrist 32c is mounted to the second arm 32b so as to be pivotable about an axis extending vertically.

The end effector 38 has a distal end divided in two parts and is Y-shaped in plan. The proximal end of the end effector 38 is secured to the distal end of the wrist 32c.

The configuration of the robot controller 40 is not limited to a particular one. For example, the robot controller may be configured such that its function is implemented by a known processor (such as a CPU) operating according to a program stored in a storage medium (memory). The monitoring method according to the present embodiment is implemented in the robotic system 10 through control of the robot 20 by the robot controller 40.

Accommodation Member 50

The accommodation member 50 is constituted by a first accommodation portion 52, a second accommodation portion 54, a third accommodation portion 56, and a fourth accommodation portion 58 which are arranged adjacent to one another, and the semiconductor wafers W are placed in advance in each of the first, second, third, and fourth accommodation portions 52, 54, 56, and 58. Each of the first, second, third, and fourth accommodation portions 52, 54, 56, and 58 is a hollow body in the shape of a rectangular parallelepiped with a front surface having an opening occupying the entirety of the front surface, and the end effector 38 is inserted into each of the accommodation portions through the opening. Each of the first, second, third, and fourth accommodation portions 52, 54, 56, and 58 can accommodate a plurality of semiconductor wafers W in such a manner that the wafers W are arranged at predetermined intervals in the upward/downward direction.

Prealigner 70

The prealigner 70 includes a prealigner body 72, a turntable 74 on which the semiconductor wafer W is placed, a non-illustrated drive source configured to rotate the turntable 74, an optical sensor 76 configured to detect the outer edge of the semiconductor wafer W rotating under the action of the drive source, and a non-illustrated processing part configured to process information such as that detected by the optical sensor 76. The prealigner 70 thus configured adjusts the circumferential location of a notch or an orientation flat provided at the outer circumference of the semiconductor wafer W, thereby adjusting the angular position of the semiconductor wafer W.

Processing Device 90

The processing device 90 receives the semiconductor wafer W whose angular position has been adjusted by the prealigner 70, and processes the semiconductor wafer W. The processing device 90 includes a processing chamber 91 in which the wafer is processed, and the outer wall defining the processing chamber 91 is provided with an inlet opening 92 through which the semiconductor wafer W unprocessed is inserted into the processing chamber 91 and an outlet opening 94 through which the semiconductor wafer W processed in the processing chamber 91 is taken out.

Predetermined process operation

A predetermined process operation performed by the robot 20 in the above robotic system 10 will now be described in detail. The predetermined process operation includes a plurality of process phases which are performed sequentially in time. In the present embodiment, the process phases are defined by dividing the predetermined process operation so that each process phase corresponds to a motion performed by the robot 20.

For example, assuming an initial state where the robot 20 is in a predetermined home position, the predetermined process operation according to the present embodiment includes first to forty-fourth process phases described below.

The predetermined process operation includes: the first process phase in which the robot 20 starts to move from the initial state and assumes a position where the robot 20 can hold a semiconductor wafer W1 accommodated in the first accommodation portion 52; and the second process phase in which the robot 20 having completed the first process phase holds the semiconductor wafer W1 accommodated in the first accommodation portion 52.

The predetermined process operation further includes: the third process phase in which the robot 20 having completed the second process phase transfers the semiconductor wafer W1 toward the prealigner 70 and assumes a position where the robot 20 can place the semiconductor wafer W1 onto the turntable 74 of the prealigner 70; the fourth process phase in which the robot 20 having completed the third process phase places the semiconductor wafer W1 onto the turntable 74; and the fifth process phase in which the robot 20 having completed the fourth process phase holds the semiconductor wafer W1 subjected to angular position adjustment and lying on the turntable 74.

The predetermined process operation further includes: the sixth process phase in which the robot 20 having completed the fifth process phase transfers the semiconductor wafer W1 toward the processing chamber 91 and assumes a position where the robot 20 can place the semiconductor wafer W1 into the processing chamber 91 through the inlet opening 92; the seventh process phase in which the robot 20 having completed the sixth process phase places the semiconductor wafer W1 into the processing chamber 91; the eighth process phase in which the robot 20 having completed the seventh process phase assumes a position where the robot 20 can pass through the outlet opening 94 and hold the semiconductor wafer W1 processed in the processing chamber 91; and the ninth process phase in which the robot 20 having completed the eighth process phase holds the processed semiconductor wafer W1 placed in the processing chamber 91.

The predetermined process operation further includes: the tenth process phase in which the robot 20 having completed the ninth operation transfers the processed semiconductor wafer W1 toward the first accommodation portion 52 and assumes a position where the robot 20 can place the semiconductor wafer W1 into the first accommodation portion 52; and the eleventh process phase in which the robot 20 having completed the tenth process phase places the semiconductor wafer W1 into the first accommodation portion 52 so that the semiconductor wafer W1 is accommodated in the first accommodation portion 52.

The predetermined process operation further includes: the twelfth process phase in which the robot 20 having completed the seventh process phase assumes a position where the robot 20 can hold a semiconductor wafer W2 accommodated in the second accommodation portion 54; the thirteenth to twenty-second process phases in which the robot 20 having completed the twelfth process phase performs the same actions on the semiconductor wafer W2 accommodated in the second accommodation portion 54 as on the semiconductor wafer W1 in the second to eleventh process phases; and the twenty-third to forty-fourth process phases in which the robot 20 having completed the twenty-second process phase performs the same actions on a semiconductor wafer W3 accommodated in the third accommodation portion 56 and a semiconductor wafer W4 accommodated in the fourth accommodation portion 58 as on the semiconductor wafer W2 in the twelfth to twenty-second process phases.

Monitoring Parameter

At least one of the motors (plurality of actuators) mounted respectively on the first to third joint shafts AX1 to AX3 is set as a monitoring target, and at least one type of monitoring parameter is assigned to the or each motor set as the monitoring target. The monitoring parameter is a parameter related to the operation of the motor. In the present embodiment, position deviation, speed deviation, acceleration deviation, and current value related to the operation of the motor are assigned as monitoring parameters. The at least one motor set as the monitoring target operates in each of the above first to forty-fourth process phases (plurality of process phases).

Monitoring Method

Figure 2:
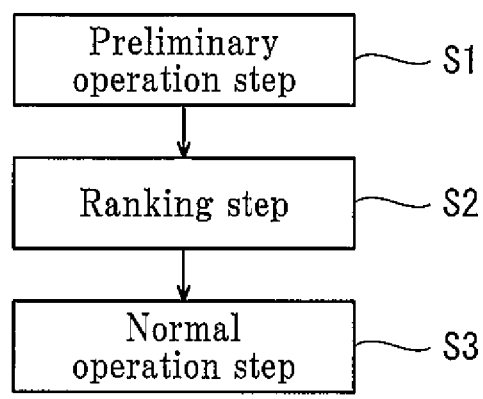
FIG. 2 is a flowchart of the monitoring method according to the embodiment of the present invention.

An example of the monitoring method of the present embodiment which is implemented in the above robotic system 10 will be described. FIG. 2 is a flowchart of the monitoring method of the present embodiment.

As shown in FIG. 2, the monitoring method of the present embodiment includes a preliminary operation step S1, a ranking step S2 performed after the preliminary operation step S1, and a normal operation step S3 performed after the ranking step S2.

Preliminary Operation Step S1

In the preliminary operation step S1, the robot is caused to perform the above predetermined process operation one or more times, and all of the assigned monitoring parameters (in the present embodiment, position deviation, speed deviation, acceleration deviation, and current value which are related to the operation of the motor) are detected in each of the above first to forty-fourth process phases for the or each motor operating as a monitoring target in the process phase.

For example, when in the first process phase the motors mounted on the first and second first joint shafts AX1 and AX2 operate and the motor mounted on the third joint shaft AX3 does not operate, all of the assigned monitoring parameters are detected for the motors mounted on the first and second first joint shafts AX1 and AX2.

The detection may be performed by the motors themselves which are configured as servo motors or may be performed by means of a position sensor, a speed sensor, an acceleration sensor, and an ammeter provided separately from the motors. For that motor of the third joint shaft AX3 which does not operate, the monitoring parameters need not be detected.

A description is given herein of the case where all of the motors (motors mounted on the first, second, and third joint shafts AX1, AX2, and AX3) are the monitoring targets. However, for example, when the level of the load imposed on a joint shaft is obviously low, the motor of the joint shaft may be excluded from the monitoring targets.

For example, the predetermined process operation may be performed only once to complete the preliminary operation step S1 in a short time. The predetermined process operation may be performed twice or more, and the detected monitoring parameters may be averaged to achieve a high accuracy of the monitoring. The period of time in which the predetermined process operation is performed one or more times may be a defined period of time such as one day or one month.

Ranking Step S2

In the ranking step S2, a load level is derived based on a predetermined load evaluation procedure for each of the monitoring parameters detected in the preliminary operation step S1, and all of the detected monitoring parameters are ranked in decreasing order of the load level. The load evaluation procedure may consist, for example, of calculating the ratios of the detected position deviation, speed deviation, and acceleration deviation to predetermined permissible limits or calculating the amount of an excess of the detected current value over a reference value relative to a predetermined permissible limit, thereby deriving the load level (for example, the calculated ratio or amount of excess may be 90% relative to the permissible limit defined as 100%). Typically, a higher load level means a higher value of the current flowing through the motor. Thus, the load level can be derived by the load evaluation procedure as mentioned above.

FIGS. 3A to 6C show examples of ranking results obtained in the ranking step of the monitoring method according to the embodiment of the present invention. In the present embodiment, as shown in FIGS. 3A to 6C, the ranking is made based on each of the monitoring parameters (position deviation, speed deviation, acceleration deviation, and current value) for each of the motors mounted on the joint shafts (AX1, AX2, and AX3). In FIGS. 3A to 6C, the first to third ranks are determined. The invention is not limited to this example. Depending on the memory capacity, only the first and second ranks may be determined, or the fourth or lower ranks may further be determined.

FIGS. 3A to 3C show an example of a position deviation ranking result obtained in the ranking step of the monitoring method according to the embodiment of the present invention. The position deviation ranking result is one obtained by deriving a load level based on the predetermined load evaluation procedure for each of the position deviations detected in the preliminary operation step S1 and making the ranking in decreasing order of the load level.

In the present embodiment, when the position deviation ranking is made for the motor of the first joint shaft AX1, the result as shown in FIGS. 3A to 3C is obtained; namely, the tenth process phase in which the load level is 80% is ranked first, the twenty-fifth process phase in which the load level is 75% is ranked second, and the forty-second process phase in which the load level is 71% is ranked third. For the motor of the second joint shaft AX2, the third process phase in which the load level is 90% is ranked first, the twelfth process phase in which the load level is 85% is ranked second, and the tenth process phase in which the load level is 82% is ranked third. For the motor of the third joint shaft AX3, the fifth process phase in which the load level is 77% is ranked first, the second process phase in which the load level is 63% is ranked second, and the thirty-eighth process phase in which the load level is 60% is ranked third.

FIGS. 4A to 4C show an example of a speed deviation ranking result obtained in the ranking step of the monitoring method according to the embodiment of the present invention. The meaning of the speed deviation ranking is the same as that of the position deviation ranking, except that the speed deviation ranking is made based on all of the speed deviations detected in the preliminary operation step S1. A description of the meaning of the speed deviation ranking is therefore omitted.

In the present embodiment, when the speed deviation ranking is made for the motor of the first joint shaft AX1, the result as shown in FIGS. 4A to 4C is obtained; namely, the forty-first process phase in which the load level is 75% is ranked first, the fourth process phase in which the load level is 74% is ranked second, and the twenty-sixth process phase in which the load level is 73% is ranked third. For the motor of the second joint shaft AX2, the twenty-second process phase in which the load level is 68% is ranked first, the second process phase in which the load level is 63% is ranked second, and the forty-first process phase in which the load level is 59% is ranked third. For the motor of the third joint shaft AX3, the eighth process phase in which the load level is 78% is ranked first, the eighteenth process phase in which the load level is 72% is ranked second, and the thirty-eighth process phase in which the load level is 68% is ranked third.

FIGS. 5A to 5C show an example of an acceleration deviation ranking result obtained in the ranking step of the monitoring method according to the embodiment of the present invention. The meaning of the acceleration deviation ranking is the same as those of the position deviation ranking and the speed deviation ranking, except that the acceleration deviation ranking is made based on all of the acceleration deviations detected in the preliminary operation step S1. A description of the meaning of the acceleration deviation ranking is therefore omitted.

In the present embodiment, when the speed deviation ranking is made for the motor of the first joint shaft AX1, the result as shown in FIGS. 5A to 5C is obtained; namely, the seventh process phase in which the load level is 97% is ranked first, the eleventh process phase in which the load level is 95% is ranked second, and the thirty-second process phase in which the load level is 88% is ranked third. For the motor of the second joint shaft AX2, the twentieth process phase in which the load level is 91% is ranked first, the twenty-second process phase in which the load level is 88% is ranked second, and the thirteenth process phase in which the load level is 79% is ranked third. For the motor of the third joint shaft AX3, the twenty-first process phase in which the load level is 90% is ranked first, the seventeenth process phase in which the load level is 89% is ranked second, and the fifth process phase in which the load level is 84% is ranked third.

FIGS. 6A to 6C show an example of a current value ranking result obtained in the ranking step of the monitoring method according to the embodiment of the present invention. The meaning of the current value ranking is the same as those of the position deviation ranking, the speed deviation ranking, and the acceleration deviation ranking, except that the current value ranking is made based on all of the current values detected in the preliminary operation step S1. A description of the meaning of the current value ranking is therefore omitted.

In the present embodiment, when the current value ranking is made for the motor of the first joint shaft AX1, the result as shown in FIGS. 6A to 6C is obtained; namely, the seventh process phase in which the load level is 97% is ranked first, the eleventh process phase in which the load level is 95% is ranked second, and the twenty-ninth process phase in which the load level is 89% is ranked third. For the motor of the second joint shaft AX2, the twentieth process phase in which the load level is 91% is ranked first, the twenty-second process phase in which the load level is 81% is ranked second, and the thirtieth process phase in which the load level is 79% is ranked third. For the motor of the third joint shaft AX3, the twenty-first process phase in which the load level is 90% is ranked first, the seventeenth process phase in which the load level is 79% is ranked second, and the forty-third process phase in which the load level is 77% is ranked third.

Once the ranking step S2 is completed, a notification of completion of the ranking step S2 may be provided. The form of the notification is not limited to a particular one. For example, the notification may be output as a text or an image on a display, may be output as a sound from a speaker, or may be output as light from a light source such as an LED.

Normal Operation Step S3

In the normal operation step S3, monitoring parameters highly ranked in the ranking step S2 are primarily monitored for the motors (actuators) that operate in the process phases in which the highly ranked monitoring parameters were detected. In the normal operation step S3 of the present embodiment, only the monitoring parameters highly ranked in the ranking step S2 are monitored for the motors (actuators) that operate in the process phases in which the highly ranked monitoring parameters were detected.

While in the present embodiment the first- to third-ranked monitoring parameters are defined as the highly ranked monitoring parameters, the invention is not limited thereto. Only the first-ranked monitoring parameter may be defined as the highly ranked monitoring parameter. The first- to second-ranked monitoring parameters, the first- to third-ranked monitoring parameters, or the first- to fourth-ranked monitoring parameters may be defined as the highly ranked parameters. The sixth- and lower-ranked monitoring parameters may be included in the highly ranked monitoring parameters.

A warning may be given when the load level of the motor under monitoring in the normal operation step S3 exceeds a predetermined threshold. The form of the warning is not limited to a particular one. Similarly to the notification of completion of the ranking step S2, the warning may be output as a text or an image on a display, may be output as a sound from a speaker, or may be output as light from a light source such as an LED.

Advantage

In the monitoring method according to the present embodiment, monitoring parameters highly ranked in the ranking step S2 (the first- to third-ranked monitoring parameters shown in FIGS. 3A to 6C are primarily monitored for the motors (actuators) that operate in the process phases in which the highly ranked monitoring parameters were detected.

The first to forty-fourth process phases do not include the work of transferring the semiconductor wafers W from one location to another within the accommodation member 50, such as transferring the semiconductor wafer W1 from the first accommodation portion 52 to the second accommodation portion 54. However, the robot 20 is designed to be able to perform various works including the mentioned work. That is, the particular purpose for which the robot 20 is used is not considered in the design stage, and it is therefore difficult to predict what level of load is imposed on each of the motors mounted on the joint shafts before the robot 20 is actually used.

In the monitoring method according to the present embodiment, the robot is caused to perform a predetermined process operation one or more times in the preliminary operation step S1, and the level of the load imposed on the joint shafts or the motors (actuators) is determined based on the monitoring parameters detected during the predetermined process operation performed one or more times. Further, as previously stated, monitoring parameters highly ranked in the ranking step S2 are primarily monitored for the motors that operate in the process phases in which the highly ranked monitoring parameters were detected.

Thus, in the monitoring method according to the present embodiment, the highly ranked monitoring parameters for which the load level is high are considered to have a high likelihood of abnormality, and are primarily monitored for the motors that operate in the process phases in which the highly ranked monitoring parameters were detected. Monitoring parameters for which the load level is low and which are not highly ranked are considered to have a low likelihood of abnormality, and monitoring is not performed for the motors that operate in the process phases in which the not highly ranked monitoring parameters were detected. As such, a robot monitoring method can be provided which is able to reduce the amount of data to be handled as compared to conventional methods and thereby solve various problems.

In the present embodiment, the actuators are motors respectively mounted on the first, second, and third joint shafts AX1, AX2, and AX3 of the robot 20. When monitoring is performed for the motors respectively mounted on the first, second, and third joint shafts AX1, AX2, and AX3 of the robot 20, the amount of data to be handled can be reduced.

In the normal operation step S3 of the present embodiment, only the monitoring parameters highly ranked in the ranking step S2 are monitored for the motors (actuators) that operate in the process phases in which the highly ranked monitoring parameters were detected. This allows a further reduction in the amount of data to be handled. Consequently, the advantage provided by the present invention can be made evident.

In the present embodiment, position deviation, speed deviation, acceleration deviation, and current value which are related to the operation of the motors (actuators) are assigned as the monitoring parameters. As such, each motor can be monitored from different aspects based on the plurality of monitoring parameters, and thus the accuracy of the monitoring can be increased.

In the present embodiment, the first to forty-fourth process phases (plurality of process phases) are defined by dividing the predetermined process operation so that each process phase corresponds to a motion performed by the robot 20. Thus, the ranking can be made as to which motion of the robot 20 imposes a high level of load on which joint shaft or motor (actuator).

In the present embodiment, once the ranking step S2 is completed, a notification of completion of the ranking step S2 may be provided. This allows the user to know the completion of the ranking step S2. Thus, for example, the user can, before start of the normal operation step S3, take measures such as performing a maintenance work on the motors that operate in the process phases in which the highly ranked monitoring parameters were detected.

In the present embodiment, a warning may be given when the load level of the motor (actuator) under monitoring in the normal operation step S3 exceeds a predetermined threshold. This allows the user to know that the load level of the motor has exceeded the predetermined threshold. Thus, the user can perform a maintenance work on the motor that operates in the process phase in which the abnormal monitoring parameter was detected.

In the present embodiment, the robot 20 is a transfer robot configured to perform the predetermined process operation including transfer of the semiconductor wafers W in a semiconductor manufacturing site. That is, the monitoring can be performed for a transfer robot configured to perform a predetermined process operation including transfer of semiconductor wafers in a semiconductor manufacturing site.

MODIFIED EXAMPLES

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

While in the embodiment described above the first to forty-fourth process phases (plurality of process phases) are defined by dividing the predetermined process operation so that each process phase corresponds to a motion performed by the robot 20, the invention is not limited thereto. More specifically, in the embodiment described above, the predetermined process operation is finely divided based on motion so that the plurality of process phases include the first process phase in which the robot 20 starts to move from the initial state and assumes a position where the robot 20 can hold the semiconductor wafer W1 accommodated in the first accommodation portion 52 and the second process phase in which the robot 20 having completed the first process phase holds the semiconductor wafer W1 accommodated in the first accommodation portion 52. The invention is not limited to this division.

The predetermined process operation may be divided based on work; that is, the predetermined process operation may be divided into process phases including, for example: a phase in which the robot 20 starts to move from the initial state and performs the work of taking the semiconductor wafer W1 out of the first accommodation portion 52 and transferring the semiconductor wafer W1 to the prealigner 70; a phase in which the robot 20 performs the work of transferring the semiconductor wafer W1, whose angular position has been adjusted by the prealigner 70, toward the processing chamber 91 and inserting the semiconductor wafer W1 into the processing chamber 91 through the inlet opening 92; and a phase in which the robot 20 performs the work of taking the processed semiconductor wafer W1 out of the chamber through the outlet opening 94 and transferring and placing the semiconductor wafer W1 into the first accommodation portion 52 so that the semiconductor wafer W1 is accommodated in the first accommodation portion 52.

While in the embodiment described above, position deviation, speed deviation, acceleration deviation, and current value which are related to the operation of the motors (actuators) are assigned as the monitoring parameters, the invention is not limited thereto. For example, at least one of the position deviation, speed deviation, acceleration deviation, and current value may be assigned as the monitoring parameter, or another type of monitoring parameter may be assigned. When only one type of monitoring parameter is assigned, the robot 20 needs to include two or more joint shafts to make the ranking in the ranking step S2.

While in the embodiment described above the robot 20 includes three joint shafts, i.e., the first, second, and third joint shafts AX1, AX2, and AX3, the invention is not limited thereto. The robot 20 may include one joint shaft, two joint shafts, or four or more joint shafts. That is, the robot 20 includes at least one joint shaft. The monitoring method according to the present invention may be carried out for motors (actuators) mounted on all of the joint shafts. When the robot 20 includes only one joint shaft, two or more types of monitoring parameters need to be assigned to make the ranking in the ranking step S2.

While in the embodiment described above the monitoring method is executed by the robot controller 40, the invention is not limited thereto. The monitoring method may be implemented by a monitoring controller which is separate from and hierarchically higher than the robot controller 40. In the case where a notification of completion of the ranking step S2 is provided and where a warning is given when the load level of the motor (actuator) under monitoring in the normal operation step S3 exceeds a predetermined threshold, the robot controller 40 may issue an output command for the notification and warning, or the monitoring controller may issue an output command for the notification and warning.

While in the embodiment described above the robot 20 is a transfer robot configured to perform a predetermined process operation in a semiconductor manufacturing site, the invention is not limited thereto. The robot 20 may be another type of transfer robot configured to perform a predetermined process operation, for example, in a food manufacturing site or car manufacturing site. In this case, for example, the robot 20 may transfer food products or automotive parts instead of the semiconductor wafers W. The robot 20 may be another type of robot used for a purpose other than transfer. In this case, for example, the robot 20 may be a welding robot configured for welding.

While in the embodiment described above the actuators are configured as motors mounted respectively on the first, second, third joint shafts AX1, AX2, and AX3, the invention is not limited thereto. For example, the actuators may be configured as motors mounted on so-called external shafts such as that of a holding mechanism (suction holding or grasping mechanism) of the end effector 38 and that of a peripheral device controlled by the robot controller 40. The actuators need not be motors and may be configured, for example, as hydraulic cylinders.

REFERENCE SIGNS LIST 10 robotic system
20 robot
30 robotic arm
32a first arm
32b second arm
32c wrist
38 end effector 40 robot controller
50 accommodation member
52 first accommodation portion
54 second accommodation portion
56 third accommodation portion
70 prealigner
72 prealigner body
74 turntable
76 optical sensor
90 processing device
91 processing chamber
92 inlet opening
94 outlet opening
AX joint shaft
S1 preliminary operation step
S2 ranking step
S3 normal operation step
W semiconductor wafer

The invention claimed is:

1. A method of monitoring a robot including a plurality of actuators and configured to perform a predetermined process operation, wherein
at least one of the actuators is set as a monitoring target,
at least one type of monitoring parameter related to operation of the actuator is assigned to the or each actuator set as the monitoring target,
the predetermined process operation includes a plurality of process phases which are performed sequentially in time, and
the at least one actuator set as the monitoring target operates in each of the process phases,
the method comprising:
a preliminary operation step of causing the robot to perform the predetermined process operation one or more times and detecting, in each of the process phases, the or each assigned monitoring parameter for the or each actuator operating as the monitoring target in the process phase;
a ranking step of deriving a load level based on a predetermined load evaluation procedure for each of the monitoring parameters detected in the preliminary operation step and ranking all of the detected monitoring parameters in decreasing order of the load level; and
a normal operation step of monitoring primarily a monitoring parameter highly ranked in the ranking step, wherein the monitoring is performed for the actuator that operates in the process phase in which the highly ranked monitoring parameter was detected.

2. The method according to claim 1, wherein the actuators are motors mounted on at least one joint shaft of the robot.

3. The method according to claim 1, wherein in the normal operation step, only the monitoring parameter highly ranked in the ranking step is monitored for the actuator that operates in the process phase in which the highly ranked monitoring parameter was detected.

4. The method according to claim 1, wherein at least one of position deviation, speed deviation, acceleration deviation, and current value which are related to the operation of the actuator is assigned as the monitoring parameter.

5. The method according to claim 1, wherein a plurality of the monitoring parameters are assigned to each actuator.

6. The method according to claim 1, wherein the process phases are defined by dividing the predetermined process operation so that each process phase corresponds to a work or motion performed by the robot.

7. The method according to claim 1, wherein once the ranking step is completed, a notification of completion of the ranking step is provided.

8. The method according to claim 1, wherein a warning is given when the load level of the actuator under monitoring in the normal operation step exceeds a predetermined threshold.

9. The method according to claim 1, wherein the robot is a transfer robot configured to perform the predetermined process operation in a manufacturing site.

10. The method according to claim 9, wherein
the manufacturing site is a semiconductor manufacturing site, and
the robot is a transfer robot configured to transfer semiconductor wafers.

* * * * *